April 2, 1929.

E. A. SOHL

BUMPER

Re. 17,255

2 Sheets-Sheet 1

Original Filed July 19, 1924

Inventor
Edgar A. Sohl
By Hull, Brock & West
Attys.

April 2, 1929. E. A. SOHL Re. 17,255

BUMPER
Filed July 19, 1924
Original Filed July 19, 1924 2 Sheets-Sheet 2

Inventor
Edgar A. Sohl,
By Hull, Brock & West,
Attys.

Reissued Apr. 2, 1929.

Re. 17,255

UNITED STATES PATENT OFFICE.

EDGAR A. SOHL, OF CLEVELAND, OHIO, ASSIGNOR TO C. G. SPRING & BUMPER COMPANY, OF DETROIT, MICHIGAN, A CORPORATION OF DELAWARE.

BUMPER.

Original No. 1,546,948, dated July 21, 1925, Serial No. 726,955, filed July 19, 1924. Application for reissue filed July 21, 1927. Serial No. 207,550.

This invention relates to bumpers for automobiles and, in the particular embodiment disclosed herein, is especially adapted for a combined rear-bumper and corner-guard construction for use with omnibuses.

Figure 1:
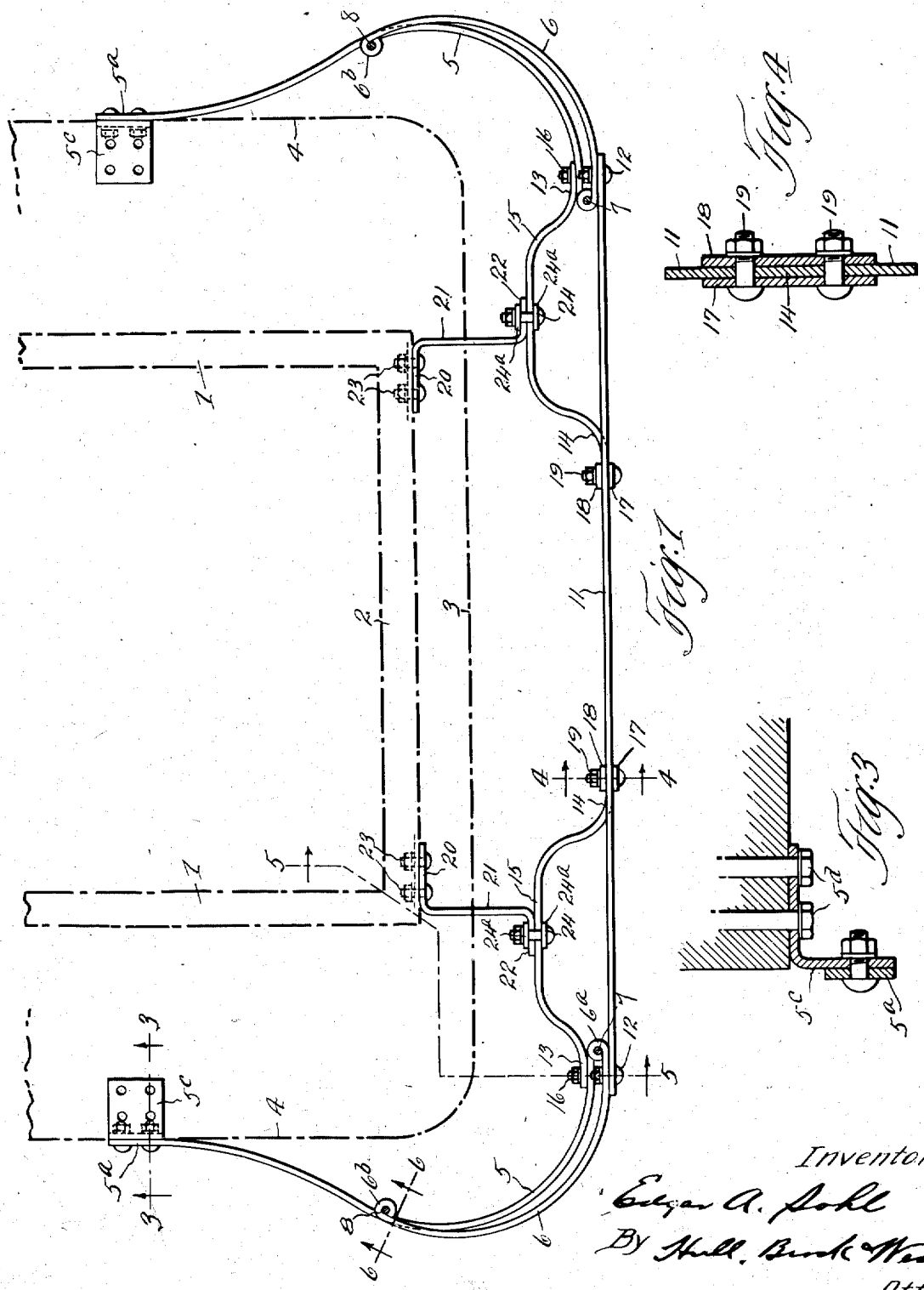
Figure 2:
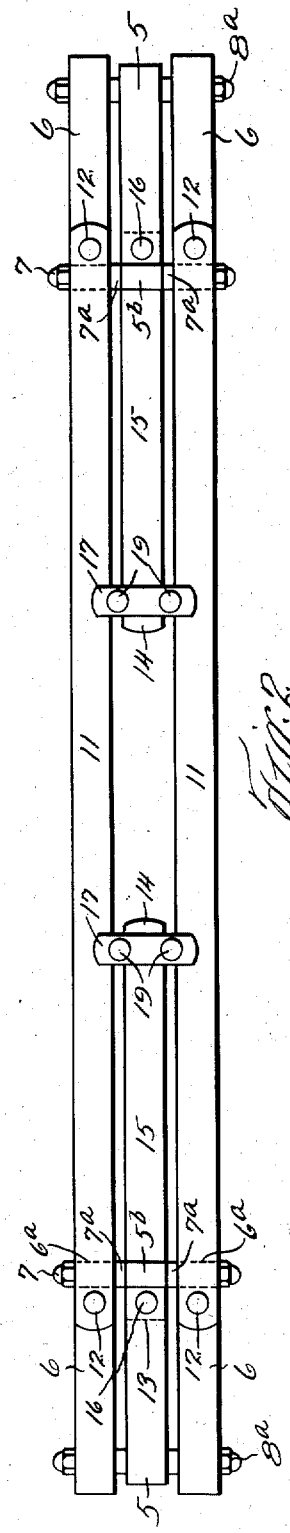
Figure 6:
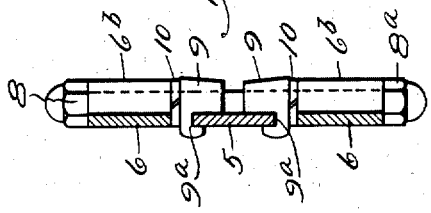
Figure 5:
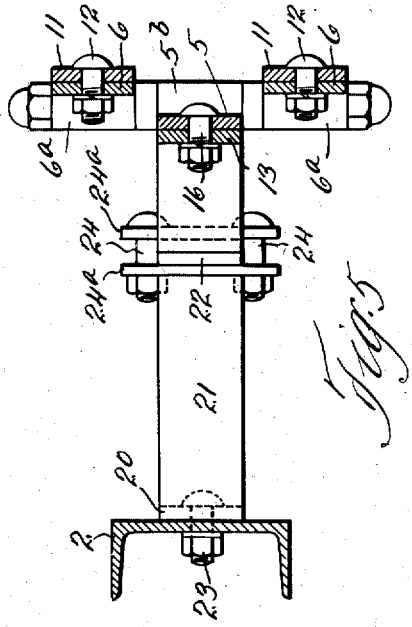

It is the general purpose and object of the invention to provide a bumper of this character which is particularly efficient for the purpose for which it is designed. Further and more limited objects of the invention are to provide a combined corner-guard and bumper construction which is easily adaptable to bodies of varying widths; also to provide a bumper of this class by which the impacts will be absorbed by and dissipated throughout the bumper- and corner-guard construction. Further and still more limited objects of the invention will be set forth hereinafter and will be realized in and through the construction shown in the drawings, wherein Fig. 1 represents a plan view of a bumper constructed in accordance with my invention, the cooperating parts of the vehicle being shown in dot-and-dash lines and certain bolts being shown in section; Fig. 2 a rear elevation of the bumper; and Figs. 3, 4, 5 and 6 are views corresponding, respectively, to the lines 3—3, 4—4, 5—5 and 6—6 of Fig. 1.

Describing the various parts by reference characters, 1 represents the rear ends of the side members and 2 the rear cross member of a vehicle frame, 3 the rear end and 4 the rear end of the side of the body which is carried by the said frame.

The complete bumper comprises a pair of curved resilient attaching bars secured at their front or inner ends to the sides of the body, a pair of curved corner guard members secured to each of the attaching bars, an impact section comprising impact bars connected to the corner-guard members, and forwardly or inwardly extending cushion bars connected to the impact bars and to the rear or outer ends of the attaching members and interposed between the impact section of the bumper and the vehicle.

The two attaching bars are indicated generally at 5 and each has a front or inner end $5^a$ which is bolted or otherwise secured to an angle iron clip $5^c$, one flange of which is bolted beneath the bottom of the body, as indicated at $5^d$. The attaching members are each curved laterally outwardly and inwardly, to provide a resilient protection for their respective corners of the vehicle as well as a support for the additional corner guard members. The rear or outer end of each attaching bar is provided with an eye $5^b$ (see Figs. 2 and 5). This eye is interposed between eyes $6^a$ on the rear or outer ends of resilient corner-guard bars or members 6, there being a pair of vertically spaced corner guard members at each end of the bumper construction. Aligned eyes $6^a$ and $5^b$ are connected by means of bolts 7, there being washers $7^a$ interposed between the vertically aligned eyes at each end of the bumper. The corner guard members are curved forwardly from their respective eyes $6^a$ and project beyond the corresponding curved corners of the attaching bars 5, the front ends of the bars 6 crossing the adjacent portions of their corresponding bars 5 and each being provided at such front end with an eye $6^b$, the aligned upper and lower eyes $6^b$ at each end of the bumper structure being connected by a bolt 8. Each bolt is provided with a pair of sleeves 9 thereon, each sleeve having a seat $9^a$ therein adapted to receive the upper and the lower edge, respectively, of the adjacent bar 5, there being spacing washers 10 interposed between each eye $6^b$ and the sleeve 9 adjacent thereto which spacing washers are adapted to be engaged by the bars 6. By setting up the nuts $8^a$ on the bolts 8, the eyes $6^b$ are forced toward each other, thereby forcing the clamping sleeves 9 toward each other and firmly securing the front ends of the corner guard bars to the attaching bars 5.

11 denotes an upper and a lower impact bar, which bars extend across the space between the ends of the bars 5 and 6, being secured to the latter bars by means of bolts 12.

For the purpose of securing the bumper structure to the vehicle frame, it is preferred to use a pair of cushion bars, one at each side of the central portion of the bumper structure and each having its ends fastened to the bumper structure with a forwardly (or inwardly) bowed central portion which may provide means for attaching supporting arms thereto. Each cushion bar comprises an outer end 13, an inner end 14, and a forwardly or inwardly bowed or projecting central portion 15, the construction providing a flattened U-shaped projection to which an attaching arm may be conveniently secured. The end portion 13 of each cushion bar is secured, as by means of a bolt 16, to the adjacent attaching bar 5, while the inner end 14 of each cushion bar extends between the impact bars 11 and is secured to such impact bars by rear and front plates 17 and 18 having their ends engaging opposite faces of the bars 11, with bolts 19 connecting the said plates between the upper and lower edges of the ends 14 and the lower and upper edges of the bars 11—see Fig. 4.

The arms which secure the body portions of the bumper to the vehicle frame are shown as of approximately Z-form, comprising each a flattened or flanged front end 20, a rearwardly or outwardly extending intermediate portion 21, and a rear or outer flange 22, which is adapted to bear against the extended central portion 15 of the corresponding cushion bar. The flanges 20 are shown as secured to the rear frame member 2 by means of bolts 23, while the flanges 22 are shown as secured to the central portions of their respective cushion bars by bolts 24.

In certain installations, it may be desirable to omit the arms 21. In this event, should the impact portion of the bumper be deflected forwardly or inwardly a sufficient distance, the projecting portions 15 of the cushion bars will engage the vehicle body or frame and thereby exercise their cushioning effect, after such deflection. Where the attaching arms 20 and 22 are employed, the cushioning effect will occur immediately upon the delivery of a blow to the rear or impact portion of the bumper.

It will be noted that the corner-guard bars 6 and the attaching bars 5 are so constructed, arranged, and connected that they provide jointly a triple curved guard for each corner of a vehicle, while the attaching bars also constitute the means for supporting the corner-guard bars. Also that, where the arms 21 are employed, these arms support the rear or outer ends of the bars 5 and 6 from the vehicle. When such arms are not employed, the cushion bars serve as means for supporting the ends of the aforesaid bars from the vehicle by connecting such ends with the ends of the opposed attaching and corner-guard bars.

Each arm 5, with the attached impact bars 6, provides an inwardly concave arch extending around the corner of the vehicle and so presents the maximum resistance to a blow directed toward the corner of the vehicle from any direction. The impact bars 6 are spaced outwardly from the attaching bar 5 and so offer the first resistance to a blow directed toward the corner. If the blow is sufficiently strong the impact bar will be distorted or the clamp 9 will slide upon the bar 5 so that the impact bars will come into the plane of the attaching bars and the latter will offer an additional resistance to the force of the blow. The impact bars, which may be of a standard size and shape, may be readily replaced without the necessity of removing the attaching members 5 from the vehicle.

Although the bumper has been described and claimed as applied to the rear of a vehicle it is apparent that it may be used in other positions upon the vehicle and it is not intended to thereby limit the use of the invention to the particular position described.

Having thus described my invention, what I claim is:—

1. The combination, with a vehicle, of a bumper comprising a pair of attaching bars each secured at its inner end to a side of such vehicle and bowed outwardly therefrom and extending about a corner thereof, a pair of corner-guard bars for each attaching bar and each supported at its inner end by an attaching bar and each also extending about a corner of the vehicle, and a pair of impact bars interposed and supported between the opposed outer ends of the attaching bars and corner-guard bars.

2. The combination, with a vehicle, of a bumper comprising a pair of attaching bars each secured at its inner end to a side of such vehicle and bowed outwardly therefrom and extending about a corner thereof, a pair of corner-guard bars for each attaching bar and arranged respectively above and below the outer portion of each attaching bar and each extending about a corner of such vehicle, means supporting the inner ends of said corner-guard bars, means connecting the outer ends of each pair of corner-guard bars and the outer end of their cooperating attaching bar, and a pair of vertically spaced impact bars extending between the opposed outer ends of the attaching bars and corner-guard bars and operatively connected to such ends.

3. The combination, with a vehicle, of a bumper comprising a pair of attaching bars each secured at its inner end to a side of such vehicle and bowed outwardly therefrom and extending about a corner thereof, a pair of corner-guard bars for each attaching bar and arranged respectively above and below the outer portion of each attaching bar and each extending about a corner of such vehicle, means supporting the inner ends of said corner-guard bars from their respective cooperating attaching bars, means connecting the outer ends of each pair of corner-guard bars and the outer end of their cooperating attaching bar, and a pair of vertically spaced impact bars extending between the opposed outer ends of the attaching bars and corner-guard bars and operatively connected to such ends.

4. The combination, with a vehicle, of a pair of attaching bars each supported at one end by the vehicle and each curved and forming a resilient protection for a corner of the vehicle, a pair of curved members at each side of the vehicle and arranged to protect the corners of the vehicle and having their rear or outer ends connected to the corresponding ends of the attaching bars and their front or inner ends secured to the corresponding attaching bars intermediate the ends of the latter, and a plurality of impact members between the rear or outer ends of the said bars.

5. A bumper comprising, in combination, a pair of vertically spaced corner-guard bars at each side of the bumper structure, an attaching bar at each side of the structure and each having one end adapted to be secured to a vehicle and the other end secured to and between the outer ends of the corresponding corner-guard bars and being also secured at an intermediate portion to and between the inner ends of said corner-guard bars, and a pair of vertically spaced impact members extending between and operatively connected to corresponding ends of the corner-guard bars.

6. A bumper comprising, in combination, a pair of vertically spaced corner-guard bars at each side of the bumper structure, a pair of vertically spaced impact bars secured to said corner guard bars, and attaching bars each secured at one end to and between the outer ends of each pair of corner-guard bars and adapted at its opposite end for attachment to a vehicle frame.

7. The combination, with a vehicle, of a bumper having outwardly bowed ends connected to said vehicle, and cushion bars secured to said bumper, one on each side of the center thereof, and each having a resilient portion projecting toward and spaced from the vehicle.

8. A bumper comprising a pair of vertically spaced impact bars and outwardly and inwardly extending attaching bars connected to and between said impact bars, and a pair of cushion bars each having one end secured to and between the impact bars and its opposite end secured to an attaching bar.

9. A bumper comprising, in combination, a pair of vertically spaced impact bars and vertically spaced corner-guard bars connected to said vertically spaced impact bars, corner attaching bars each having its outer end secured to and between corresponding ends of the corner-guard bars and each having an intermediate portion connected to and between the inner ends of its cooperating corner-guard bars, and a cushion bar at each side of the bumper structure, each cushion bar having one end secured to the outer end of an attaching bar and its opposite end secured to and between the impact bars.

10. The combination, with a vehicle, of a pair of attaching bars each supported at one end by the vehicle and a pair of vertically spaced impact bars extending between the outer ends of said attaching bars and above and below the same and connected thereto, a pair of corner-guard bars at each side of the bumper structure and having their rear or outer ends connected to the corresponding ends of the attaching bars and their front or inner ends secured to the corresponding attaching bars intermediate the ends of the latter, and forwardly projecting cushion bars secured to the bumper structure and located on each side of the center of said structure and between the same and the outer portions of the corner-guard bars.

11. The combination, with a vehicle, of a bumper having outwardly bowed ends connected to said vehicle, cushion bars secured to said bumper, one on each side of the center thereof, and each having a resilient central portion projecting toward the vehicle, and arms connecting such central portions with the vehicle.

12. A bumper comprising an impact section and outwardly bowed resilient attaching members, a pair of cushion bars secured to the impact section, one on each side thereof, and each having a resilient portion projecting toward the vehicle frame or body, and arms connecting such resilient portions of said cushion bars with said vehicle.

13. The combination, with a vehicle, of a pair of attaching bars each supported at one end by the vehicle and a pair of vertically spaced impact bars extending between the outer ends of said attaching bars and above and below the same and connected thereto, a pair of corner-guard members at each side of the bumper structure and having their rear or outer ends connected to the corresponding ends of the attaching bars and their front or inner ends secured to the corresponding attaching bars intermediate the ends of the latter, forwardly projecting cushion bars secured to the bumper structure and located on each side of the center of said structure and between the same and the outer portions of the corner-guard members, and an arm secured to each of said cushion bars and to the vehicle frame.

14. A bumper comprising in combination outwardly and rearwardly extending attaching bars having their front or inner ends adapted for attachment to a vehicle and provided each at its rear or outer end with an eye, an upper and a lower corner-guard bar for each attaching bar and each having an eye at its rear or outer end adapted to align with the eye in the corresponding end of the said attaching bar, bolts extending through such aligned eyes, each corner-guard bar having an eye at its inner end, bolts extending through the aligned eyes of each pair of corner-guard bars, clamps on each bolt adapted to engage the portion of the attaching bar which is interposed between such eyes, and upper and lower impact bars secured to the rear or outer portions of the corner-guard bars.

15. A bumper comprising end members adapted to be attached to opposite sides of a vehicle, an impact section connected to said end members, a pair of cushion members each connected to the bumper on opposite sides of the center thereof and between such center and an end of said bumper, and spacing members for securing said cushion members to said vehicle.

16. A bumper comprising end members adapted to be attached to opposite sides of a vehicle, an impact section connected to such end members, and a cushion member on each side of the center of said bumper and between such center and an end of said bumper, each cushion member having its ends secured to said bumper and an intermediate portion projecting toward the vehicle to which the said bumper is attached.

17. A bumper comprising end members adapted to be attached to opposite sides of a vehicle, an impact section connected to such end members, and a cushion member on each side of the center of said bumper and between such center and an end of said bumper, each cushion member having its ends secured to said bumper and an intermediate portion projecting toward the vehicle to which the said bumper is attached, and a spacing member connected to each of said cushion members for securing the same to such vehicle.

18. A bumper comprising an impact section supported at its end portions from the sides of a vehicle, and a cushion member connected at its ends to said bumper and having a portion intermediate the ends thereof projecting from said bumper toward the vehicle to which the said bumper may be attached.

19. The combination, with a vehicle, of a pair of attaching bars each supported at one end by the vehicle, a pair of corner-guard members at each side of the bumper structure and having their rear or outer ends connected to the rear or corresponding ends of the cooperating attaching bars and their front or inner ends secured to the corresponding attaching bars, forwardly projecting cushion bars secured to the bumper structure and located on each side of the center of such structure and between the same and the outer portions of the corner-guard members, an arm secured to each of said cushion bars and to the vehicle, and a pair of vertically spaced impact bars having their ends connected directly to the corner-guard bars on opposite sides of the bumper structure.

20. A vehicle bumper including a pair of bowed corner guards adapted to extend around the corner of the vehicle and have their end portions supported from the sides and the end of the vehicle, an intermediate impact section connected to the rear or outer end portions of the corner guards, and resilient means for bracing the central portion of the intermediate impact section.

21. A corner guard for a vehicle, said guard including an attaching bar adapted at its forward end portion to be attached to the side of the vehicle and being bent to form an outwardly bowed arch extending from a point in front of the end of said vehicle and passing around and to the rear of the corner thereof, and an impact bar supported from said attaching bar and having a portion intermediate its ends spaced outwardly from the corresponding portion of the attaching bar.

22. A corner guard for a vehicle, said guard including an attaching bar adapted at its forward end portion to be supported from the side of the vehicle and being bent to form an outwardly bowed arch extending from a point in front of the end of said vehicle around and to the rear of the corner thereof, and a pair of impact bars adapted to be connected to said attaching bar and having portions intermediate their ends spaced outwardly from the corresponding portion of said attaching bar.

23. A corner guard for a vehicle, said guard including an attaching bar adapted at its forward end portion to be supported from the side of the vehicle and bent to form an outwardly bowed arch extending from a point in front of the end of said vehicle around and to the rear of the corner thereof, and a pair of impact bars each adapted to be clamped at one end to the said attaching bar and having a portion intermediate its ends spaced outwardly from the corresponding portion of said attaching bar.

24. A corner guard for a vehicle, said guard including an auxiliary bar adapted at its forward end portion to be attached to the side of the vehicle and bent to form an outwardly bowed arch extending from a point in front of the end of said vehicle around and to the rear of the corner thereof, and a pair of impact bars each having one end pivotally connected to the auxiliary bar and the other end clamped to the said bar and its intermediate portion spaced outwardly from said bar.

25. In a vehicle bumper, the combination of a pair of corner guards each of which includes a bar adapted to be attached at its forward end portion to the side of a vehicle and bent to form a reversely curved guard extending from a point spaced forwardly from the end of the vehicle around and to the rear of the corner thereof, a resilient impact member adapted to connect the two corner guards, and means for supporting the intermediate portion of the bumper.

26. In a vehicle bumper the combination of a pair of corner guards each of which includes a bar adapted at its forward end portion to be attached to the side of the vehicle and bent to form an outwardly bowed arch extending from a point spaced forwardly from the end of the vehicle around and to the rear of the corner thereof, a resilient impact member adapted to be connected to the corner guards, and a resilient bar having a portion intermediate its ends spaced forwardly from said impact member for attachment to the vehicle.

27. In a vehicle bumper the combination of a pair of corner guards each of which includes an attaching bar adapted at its forward end portion to be attached to the side of of a vehicle and bent to form an outwardly bowed arch extending from a point spaced forwardly from the end of the vehicle around and to the rear of the corner thereof, each of said attaching bars having an impact bar spaced therefrom and adapted to be attached thereto, a resilient impact member connected to the corner guards, and means for supporting the rear portion of the bumper.

28. In a vehicle bumper the combination of a pair of corner guards, each including a bar adapted to be attached to the side of a vehicle and bent to form an outwardly bowed arch extending from a point spaced forwardly from the end of the vehicle around and to the rear of the corner thereof and each having an impact member connected thereto and spaced therefrom intermediate its ends, a resilient impact section connected to said corner guards, and a resilient support having a portion intermediate its ends bent forwardly to provide a cushion support from the vehicle.

29. A vehicle bumper including a resilient central impact section adapted to protect the rear of a vehicle, and a pair of outwardly bowed arched corner guards adapted to extend around and protect corners of the vehicle, each of said corner guards having its forward end substantially parallel to the side of the vehicle and being supported at its forward end portion from the side of the vehicle and at its rear end portion from the central impact section.

30. In a resilient vehicle bumper the combination of a central impact section adapted to protect the rear of a vehicle, corner impact sections rigidly attached to said central impact section and bent forwardly and inwardly to provide inwardly concave guards for corners of said vehicle, and means for supporting the end and intermediate portions of said bumper from said vehicle.

31. A vehicle bumper including a pair of impact members adapted to extend across the end of a vehicle and each having forwardly and inwardly bent end portions adapted to extend around the corner of the vehicle and form inwardly concave arched corner guards, and means for supporting the ends and intermediate portions of the impact members from the vehicle.

32. In a vehicle bumper the combination of a pair of corner guards, each guard including a pair of impact bars adapted to be supported from the side of the vehicle and being bent to form outwardly bowed arches extending from points spaced forwardly from the rear of the vehicle and around and to the rear of the corners thereof, an intermediate impact section connected to the corner guards, and a support having a portion intermediate its ends bent forwardly for attachment to the vehicle and adapted to resiliently support the rear portion of the bumper.

33. A resilient vehicle bumper comprising a central impact section adapted to protect an end of a vehicle and having rigidly fixed thereto forwardly and inwardly bent sections providing outwardly bowed corner guards, means for supporting the end portions of said bumper from the sides of the vehicle, and forwardly bent cushion supports adapted to resiliently support the central portion of the bumper.

34. A vehicle bumper comprising a pair of corner guards, each having its forward end substantially parallel to a side of a vehicle and having its rear end portion bent outwardly and inwardly to form an outwardly bowed guard for the adjacent corner, a center impact section connecting the rear ends of said corner guards and corner impact bars connected at their end portions to said corner guards and spaced therefrom intermediate their ends.

35. A vehicle bumper comprising corner guards each having an end portion substantially parallel to a side of a vehicle and its other end portion extending substantially parallel to an end of the vehicle and having its intermediate portion bowed outwardly to form arched guards, and a resilient impact section connecting the opposed ends of said corner guards.

36. A vehicle bumper comprising reversely curved corner guards each connected to a side of the vehicle and adapted to protect a corner thereof, and a resilient impact section connecting the opposed ends of the corner guards.

37. A corner guard for a vehicle comprising a support bar connected to the side of the vehicle and reversely curved to extend around and protect a corner thereof, and an impact bar carried by said support bar and spaced therefrom intermediate its ends.

In testimony whereof I hereunto affix my signature.

EDGAR A. SOHL.